July 11, 1933.  B. D. BEDFORD  1,918,173
PHASE SHIFTING CIRCUITS
Filed Sept. 23, 1931
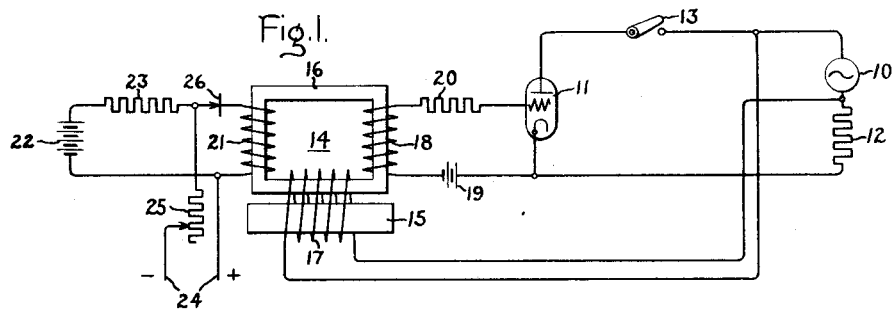
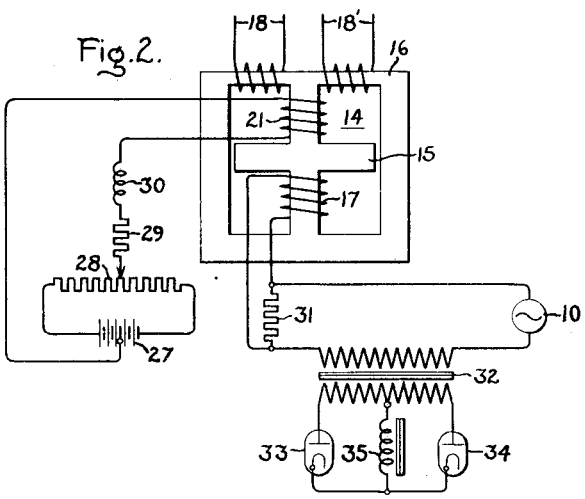
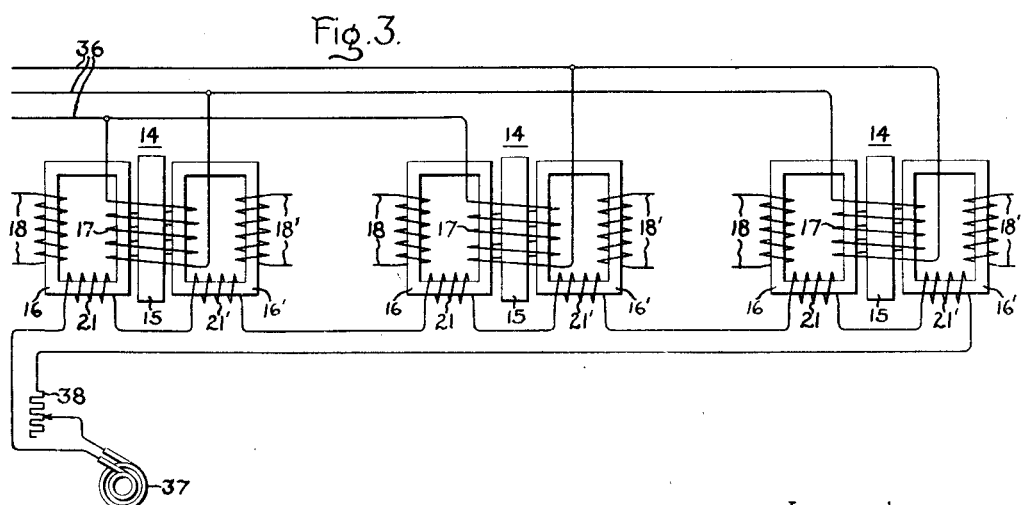
Inventor:
Burnice D. Bedford,
by Charles E. Tullar
His Attorney.

Patented July 11, 1933

1,918,173

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

PHASE SHIFTING CIRCUITS

Application filed September 23, 1931. Serial No. 564,623.

My invention relates to phase shifting circuits, and more particularly to such circuits adapted to derive from an alternating current circuit an alternating potential variable in phase with respect to that of the alternating current circuit.

The use of valves of the vapor electric discharge type in electric valve converting apparatus of several types has been found particularly advantageous because of the relatively large amounts of power which may be handled at ordinary operating voltages. In the majority of the electric valve converting apparatus it is necessary to maintain the valves nonconductive for a predetermined portion of each cycle of operation of the apparatus and to render the valves conductive for another predetermined portion of each cycle. The use of a periodic potential of peaked wave form has been found particularly advantageous both because of the accuracy with which the point in the cycle at which the valve is rendered conductive may be determined, and because of the fact that the grid is positive for a relatively short period of each cycle, thereby adapting the valve to those circuits in which the valves conduct current for only a relatively short portion of each cycle. This feature is disclosed and broadly claimed in my copending application Serial No. 485,335, filed September 29, 1930, and assigned to the same assignee as the present application. In many electric valve converting apparatus it is desirable to shift the phase of the grid potentials in order to control the energy transmitted by the apparatus. Heretofore it has required several distinct pieces of apparatus to secure an alternating potential of peaked wave form, the phase of which may be varied at will. My invention relates more specifically to an improved phase shifting apparatus by means of which a periodic potential of peaked wave form may be shifted in phase at will.

It is an object of my invention, therefore, to provide an improved phase shifting apparatus for periodic potentials of peaked wave form which will overcome the above mentioned disadvantages of the arrangements of the prior art and which will be simple and reliable in operation.

It is another object of my invention to provide an improved phase shifting apparatus in which an alternating potential of peaked wave form may be shifted in phase substantially 180 electrical degrees by means of a single independent control current.

In accordance with my invention an alternating potential of peaked wave form is generated from a self saturating transformer energized from a source of alternating potential. A magnetic core of the transformer is provided with an independent source of magnetomotive force which may be controlled to control the points in the cycle of alternating potential at which the resultant magnetomotive force passes through zero, which correspond to the the points in the cycle at which the peaked waves are generated in the secondary winding of the transformer. The additional magnetomotive force may be provided by means of an additional magnetizing winding on the transformer core, energized from a suitable source of control potential. In accordance with a modification of my invention, the alternating potential supplied to the transformer is first converted into one of rectangular wave form by means of which a phase shift of substantially 180 electrical degrees in the alternating potential of peaked wave form may be obtained without any diminution in amplitude.

For a better understanding of my invention together with other and further objects thereof, reference is had to the following description taken in connection with the accompany drawing and its scope will be pointed out in the appended claims. Fig. 1 of the drawing illustrates my invention as embodied in an apparatus for producing an alternating potential of peaked wave form variable in phase in response to variations of a unidirectional control potential; Fig. 2 shows a modification of my invention in which the control potential is variable in both magnitude and polarity and in which there are obtained two alternating potentials of peaked wave form variable in phase in opposite directions, while Fig. 3 illustrates an extension of my system to a polyphase system in which the control potential is an alternating one.

Referring now to Fig. 1 of the drawing, there is illustrated an arrangement for deriving from an alternating current source 10 an alternating potential of peaked wave for exciting the control grid of a vapor electric discharge device 11, which serves to connect a load device 12 across the source 10 through a switch 13. This apparatus comprises a transformer 14 having a nonsaturable core member 15, and a saturable core member 16, both excited by means of a primary winding 17 energized from the source 10. On the saturable core 16 is provided a secondary winding 18 in which is induced an alternating potential of peaked wave form which may be impressed upon the control grid of the valve 11 through a negative bias battery 19 and a current limiting resistor 20. In order to vary the phase of the alternating potential of peaked wave form supplied by the winding 18, the magnetic core 16 is provided with an independent source of magnetomotive force comprising a winding 21 energized from a bias battery 22 through a current limiting resistor 23 from a suitable source of control potential 24, through a variable resistor 25, connected in opposition to the bias battery 22. A rectifier 26 is preferably connected in series with the winding 21 to prevent the reversal of the magnetomotive force thereof, in case the unidirectional potential supplied by the control source 24 should exceed that of the battery 22. The battery 22 and resistor 23 are preferably chosen so that the magnetomotive force produced thereby through the winding 21 is substantially equal to the amplitude of the alternating magnetomotive force produced by the primary winding 17. By placing the winding 21 on only the saturable core 16 rather than on both cores 15 and 16, the component of alternating potential induced in the control circuit may be reduced to a minimum.

In considering the operation of the above described apparatus, it will be assumed that the potential supplied from the control source 24 through resistor 25 is just equal and opposite to that supplied by means of the bias battery 22 through the resistor 23, with the result that no current will flow through the magnetizing winding 21. Under these conditions an alternating potential of peaked wave form will be supplied by the winding 18, the peaks ocurring, as is well understood by those skilled in the art, at the points in the cycle of alternating potential at which magnetomotive force of the winding 17 passes through zero. With such an arrangement the control grid of the vapor electric valve 11 is given a single positive impulse once each cycle so that the load device 12 will be energized through the valve 11 only at this particular point in the cycle, irrespective of the point in the cycle at which the switch 13 is closed. Such a timing arrangement is often advantageous as pointed out in my above mentioned application, Serial No. 485,335. When it is desired to change the point in the cycle of alternating potential at which electric valve 11 is made conductive and the load device 12 is energized, variable resistor 25 is adjusted so that the control potential supplied by the source 24 is less than that supplied by the bias battery 22 with the result that a biasing magnetomotive force is supplied by the magnetizing winding 21. The resultant of this biasing magnetomotive force supplied by the winding 21 and the alternating magnetomotive force supplied by the winding 17 will now pass through zero at other points in the cycle of alternating potential, as will be well understood by those skilled in the art, and the peaked waves generated by the winding 18 will be shifted in phase, thus changing the point in the cycle of alternating potential at which the electric valve 11 is made conductive. It will be understood that the positive and negative peaks of the alternating potential supplied by the winding 18 will be shifted in phase in an opposite direction, but, since only the positive peak is utilized to overcome the negative bias battery 19 and render the valve 11 conductive, the other peak may be neglected. With this arrangement a shift in phase of the peaks of substantially 90 electrical degrees may be obtained. In case the control potential from the source 24 is increased above that of the biasing potential supplied by the battery 22, the magnetomotive force of the winding 21 would reverse polarity and thus shift the phase of the peaked wave in battery 22 the opposite direction. This may be avoided by the rectifier 26, connected in series with the winding 21 to prevent the reversal of current therethrough. Such an arrangement permits the use of a control potential variable within wide limits but limits the shift in phase to 90 electrical degrees. In case the magnetomotve force of the winding 21 exceeds that of the main winding 17 when the control potential is reduced to zero, the magnetic core 16 becomes completely saturated so that no potential peaks are induced in the winding 18. In this way the saturation of the transformer 14 is equivalent to a switch, turning off and on the excitation of the valve 11.

In certain cases it may be desirable to secure a shift in phase of the peaked wave of substantially 180 electrical degrees. This may be accomplished by the arrangement of Fig. 2 in which the magnetizing winding 21 of the transformer 14 is energized from a battery 27 and potentiometer 28 through a current limiting resistor 29. With this arrangement the controlling magnetomotive force of the winding 21 may be varied from zero to maximum in either direction. The alternating component flowing in the control circuit may be reduced by a reactor 30 included in circuit with the magnetizing winding. In case it is desired to secure two alternating potentials of peaked wave form oppositely variable in phase, an additional secondary winding 18' may be mounted on a saturable portion 16 of the core. It can easily be shown that the amplitude of the peaked waves generated in the windings 18 and 18' depends upon the change in slope of the flux wave of the magnetic core member 16 when passing to or from saturation. Thus, if the bias is such that the core member does not become saturated until near the peak of the alternating flux wave, where it is nearly flat, it will be apparent that the amplitude of the peaked wave is substantially reduced. Such conditions are encountered in case it is desired to secure a phase shift of a full 180 electrical degrees. However, by impressing an alternating potential of rectangular wave form upon the primary winding 17 of the transformer 14 the flux curve tends to become substantially triangular so that the change in slope of the flux waves when passing to or from saturation is substantially constant irrespective of the point in the cycle at which saturation takes place. This results in an alternating peaked potential of constant amplitude. As illustrated in Fig. 2, such a result may be obtained by energizing the winding 17 with a potential across a resistor 31 connected to the source of alternating current 10 through a series transformer 32, the secondary winding of which is short circuited through a pair of electric valves 33 and 34 and a reactor 35, which tends to maintain the current through the resistor 31 substantially rectangular in wave form. With this arrangement the alternating potentials of peaked wave form of the windings 18 and 18' may be shifted in phase substantially 180 electrical degrees in opposite directions and the amplitude of the peaks will remain substantially constant.

In Fig. 3 there is illustrated an extension of my invention to a three phase system in which a separate transformer 14 is energized from each of the three phases of a three phase alternating current supply circuit 36. In this arrangement each of the transformers 14 has two independent saturable core members 16 and 16' with their associated secondary windings 18 and 18' and magnetizing windings 21 and 21' respectively. As illustrated, the several magnetizing windings 21 and 21' are connected in series and adapted to be energized from a source of alternating current 37 of a frequency lower than that of the alternating current circuit 36, through a variable resistor 38. The windings 21 and 21' are connected as illustrated so that they produce biasing magnetomotive forces of opposite polarities in the cores 16 and 16'. With this arrangement the peaks of opposite polarities supplied by windings 18 and 18' are shifted in the same direction so that they are suitable for exciting a pair of electric valves utilized in a polyphase system, the conductive periods of which are displaced by 180 electrical degrees. By energizing the magnetizing windings 21 and 21' from a source of alternating potential of a frequency lower than that from which the primary windings 17 are energized, the phase of the peaked potential waves are periodically shifted back and forth through any desired angle at the frequency of the alternating current source 37.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a source of alternating potential, a self saturating transformer energized therefrom and provided with a secondary winding in which is induced an alternating potential of peaked wave form, and an independent source of magnetomotive force for said transformer for determining the point in the cycle of alternating potential at which the resultant magnetomotive force passes through zero and thus the phase of said secondary potential.

2. In combination, a source of alternating potential, a saturable transformer energized from said source and provided with a secondary winding in which is induced an alternating potential of peaked wave form, a source of control potential, and an auxiliary winding for said transformer energized from said control source for modifying the saturation of said transformer and thus controlling the phase of said alternating potential of peaked wave form.

3. In combination, a source of alternating potential, a transformer energized therefrom and provided with a saturable magnetic path and a substantially non-saturable leakage path, a secondary winding linking said saturable path for supplying an alternating potential of peaked wave form, and an additional magnetizing winding linking said saturable path for varying the phase of the secondary potential.

4. In combination, a source of alternating potential, a self saturating transformer energized therefrom and provided with a secondary winding for supplying an alternating potential of peaked wave form, an independent magnetizing winding for said transformer, a source of control current for energizing said magnetizing winding, and means for varying the energization of said magnetizing winding to vary the phase relation of said secondary potential of peaked wave form.

5. In combination, a source of alternating potential, a self saturating transformer energized therefrom and provided with a secondary winding for supplying an alternating potential of peaked wave form, a source of unidirectional biasing magnetomotive force for said transformer, and a source of variable magnetomotive force for said transformer opposed to said biasing magnetomotive force for varying the phase relation of said secondary potential of peaked wave form.

6. In combination, a source of alternating potential, a self saturating transformer energized therefrom and provided with a secondary winding for supplying an alternating potential of peaked wave form, an independent magnetizing winding for said transformer, a source of direct current for constantly magnetizing said winding, and a source of variable direct current connected in opposition to said first source for varying the phase relation of said secondary potential of peaked wave form.

7. In combination, a source of alternating potential, a self saturating transformer energized therefrom and provided with a secondary winding for supplying an alternating potential of peaked wave form, an independent magnetizing winding for said transformer, a source of constant biasing current connected to said biasing winding, a source of variable current connected in opposition to said biasing current for varying the phase relation of said secondary potential of peaked wave form, and a rectifier connected between said magnetizing winding and said sources of magnetizing current to prevent the reversal thereof.

8. In combination, a source of alternating potential, a self saturating transformer energized therefrom and provided with a secondary winding for supplying an alternating potential of peaked wave form, an independent magnetizing winding for said transformer, a source of direct current variable in magnitude and polarity for variably exciting said magnetizing winding to vary the phase of said secondary potential of peaked wave form in either direction with respect to that of said alternating current source.

9. In combination, a source of alternating potential, a saturable transformer energized therefrom and provided with a secondary winding for supplying an alternating potential of peaked wave form, an independent magnetizing winding for varying the saturation of said transformer, a source of control current for energizing said magnetizing winding, means for varying the energization of said magnetizing winding to vary the phase relation of said secondary potential of peaked wave form, and reactance means included in said control circuit for substantially eliminating induced alternating currents therein.

10. In combination, a source of alternating potential, a saturable transformer energized therefrom and provided with a pair of secondary windings for supplying alternating potentials of peaked wave form and opposite polarities, an independent magnetizing winding for said transformer, a source of control current for energizing said magnetizing winding, and means for varying the energization of said magnetizing winding to vary the phase relations of said secondary potentials of peaked wave form in opposite directions.

11. In combination, a source of alternating potential of substantially rectangular wave form, a saturable transformer energized therefrom and provided with a secondary winding for supplying an alternating potential of peaked wave form, an independent magnetizing winding for said transformer, a source of control current for energizing said magnetizing winding, the maximum magnetomotive force of said magnetizing winding being as large as the amplitude of the main magnetomotive force of the transformer, and means for varying the energization of said magnetizing winding from zero to maximum in either direction to secure a shift in phase of said secondary potential of peaked wave form of substantially 180 electrical degrees.

12. In combination, a source of alternating potential, a saturable transformer energized therefrom and provided with a pair of secondary windings for supplying alternating potentials of peaked wave form and opposite polarity, and an independent source of magnetomotive force for said transformer oppositely related to the fluxes of said secondary windings for similarly varying the phases of said secondary potentials of peaked wave form.

13. In combination, a source of alternating potential, a transformer energized therefrom and provided with a pair of saturable core members a secondary winding cooperating with each of said saturable core members for producing an alternating potential of peaked wave form, and an independent source of magnetomotive force for said transformer oppositely related to the fluxes of said core members for similarly varying the phases of said secondary potentials of peaked wave form.

14. In combination, a source of alternating potential, a saturable transformer energized therefrom and provided with a secondary winding for supplying an alternating potential of peaked wave form, and an independent source of alternating magnetomotive force for said transformer of a frequency substantially lower than that of said source of alternating potential, whereby the phase of said secondary potential of peaked wave form is periodically varied at the frequency of said magnetomotive force.

15. In combination, a source of polyphase alternating potential, a saturable transformer energized from each phase of said source and provided with a secondary winding for supplying an alternating potential of peaked wave form, an independent magnetizing winding for each of said transformers, and means for similarly energizing said magnetizing windings to shift similarly the phases of said secondary potentials of peaked wave form.

16. In an electric translating circuit, a source of alternating potential, an electric valve provided with an anode, a cathode, and a control grid, a saturable transformer for energizing said grid from said source, and means for controlling the saturation of said transformer for controlling the conductivity of said valve.

17. In an electric translating circuit, a source of alternating potential, an electric valve provided with an anode, a cathode, and a control grid, a self-saturating transformer energized from said source for impressing upon said control grid a periodic potential of peaked wave form to render said valve conductive at a predetermined point in the cycle of alternating potential, and means for varying the saturation of said transformer to vary the point at which said valve is rendered conductive.

18. In an electric translating circuit, a source of alternating potential, an electric valve provided with an anode, a cathode, and a control grid, a self-saturating transformer energized from said source for impressing upon said control grid a periodic potential of peaked wave form to render said valve periodically conductive at predetermined points in the cycle of alternating potential, and means for saturating said transformer to maintain said valve non-conducting.

19. In an electric translating circuit, a source of alternating potential, an electric valve provided with an anode, a cathode, and a control grid, a self-saturating transformer energized from said source for impressing upon said control grid a periodic potential of peaked wave form to render said valve periodically conductive at predetermined points in the cycle of alternating potential, and means for varying the saturation of said transformer to vary the points in the cycle of alternating potential at which said valve is rendered conductive, and for completely saturating said transformer to maintain said valve nonconductive.

20. The method of controlling the conductivity of a grid controlled electric valve excited from a saturable transformer connected to a source of alternating potential which comprises varying the saturation of said transformer to vary the point in the cycle of alternating potential at which said valve is rendered conductive.

21. The method of controlling the conductivity of a grid controlled electric valve excited from a saturable transformer connected to a source of alternating potential which comprises varying the saturation of said transformer to vary the point in the cycle of alternating potential at which said valve is rendered conductive and completely saturating said transformer to maintain said valve nonconductive.

In witness whereof, I have hereunto set my hand.

BURNICE D. BEDFORD.